July 15, 1924.
E. H. HARFORD
1,501,772
ANTIKICKING DEVICE FOR ANIMALS
Filed June 22, 1922     2 Sheets-Sheet 1
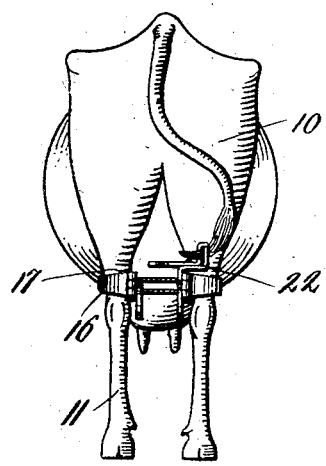
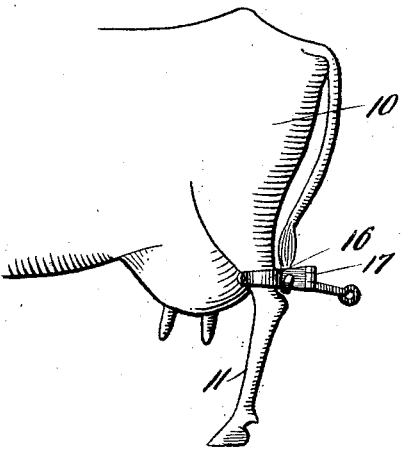
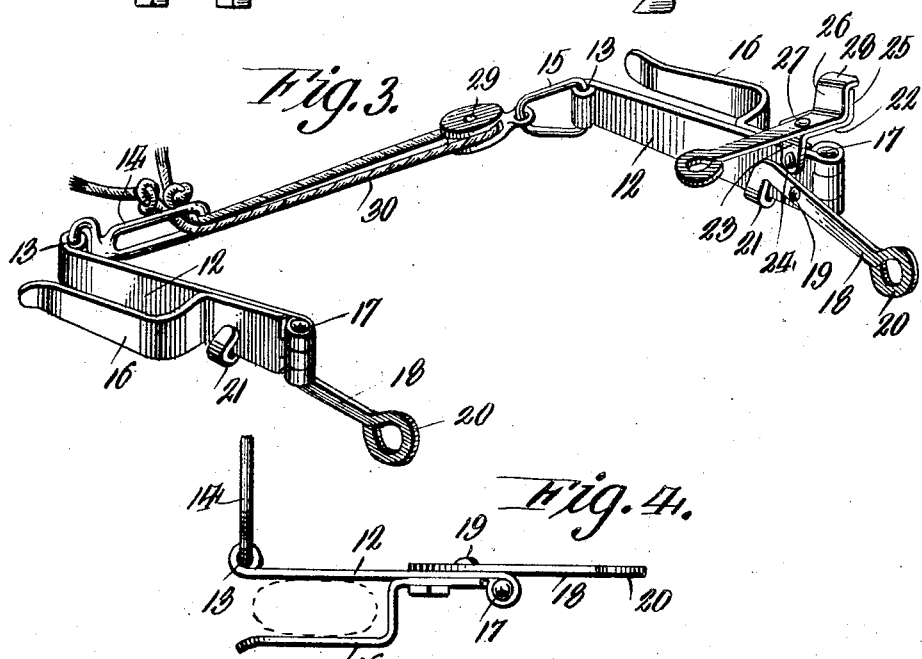
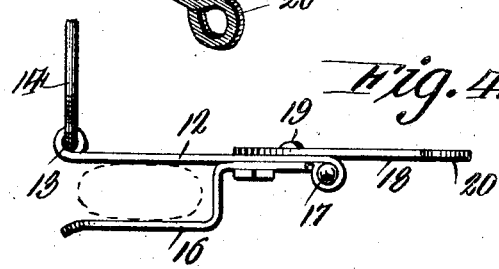
WITNESSES
Inventor
EMORY H. HARFORD
By Richard B. Owen
Attorney

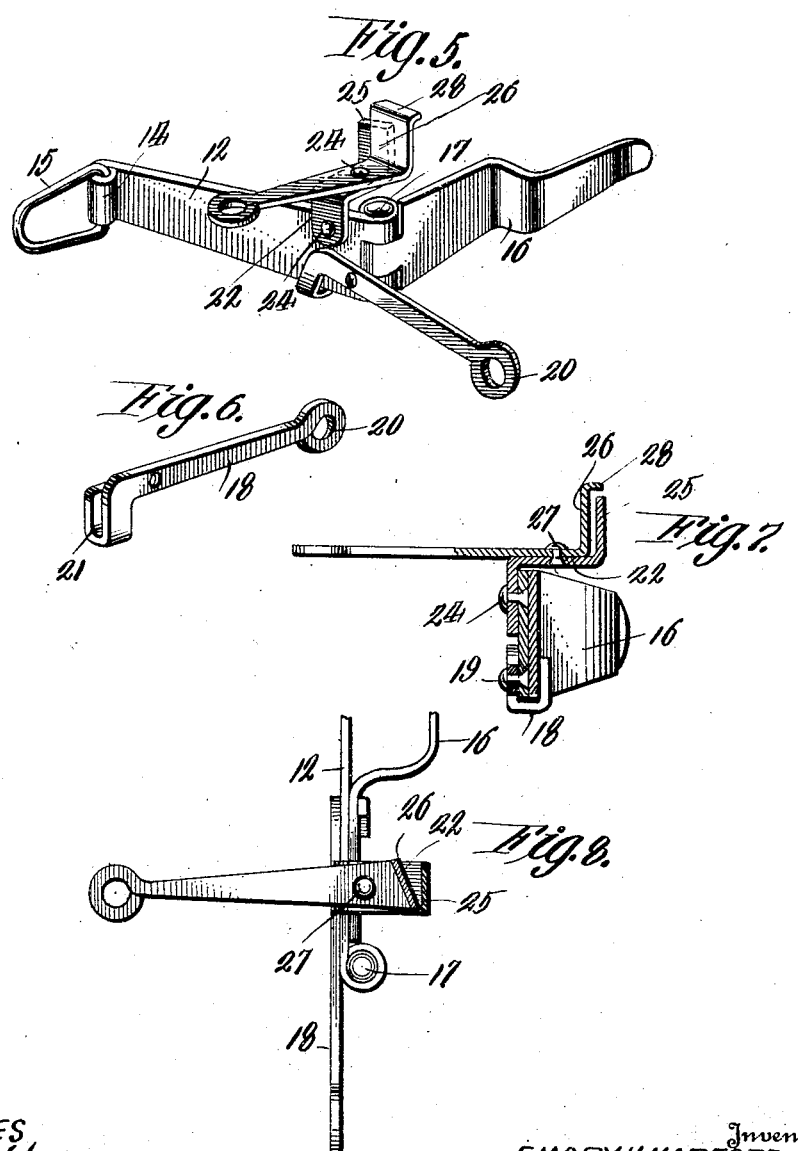

Patented July 15, 1924.

1,501,772

UNITED STATES PATENT OFFICE.

EMORY H. HARFORD, OF PIPER CITY, ILLINOIS.

ANTIKICKING DEVICE FOR ANIMALS.

Application filed June 22, 1922. Serial No. 570,116.

*To all whom it may concern:*

Be it known that I, EMORY H. HARFORD, a citizen of the United States, residing at Piper City, in the county of Ford and State of Illinois, have invented certain new and useful Improvements in Antikicking Devices for Animals, of which the following is a specification.

My invention relates to improvements in antikicking devices or hopples for animals.

An object of my invention is to provide a hopple that may be easily applied and quickly detached from the legs of an animal.

A further object of my invention is to provide a hopple that is provided with a device to hold an animal's tail so as to keep the animal from switching its tail.

A still further object of my invention is to provide a hopple that is not injurious to the animal to which it is applied.

A still further object of my invention is to provide a hopple that is strong, durable, simple and inexpensive in construction.

Other objects and advantages of the invention will be apparent during the course of the following description.

In the accompanying drawings forming a part of the specification and in which like numerals are employed to designate like parts throughout the same, Figure 1 is a view showing the hopple applied to the hind legs of a cow, Figure 2 is a side elevation showing the device applied, Figure 3 is a perspective view of the device assembled, Figure 4 is a top plan view of one of the leg holding elements, Figure 5 is a perspective view of one of the leg holding elements when open and the tail holding device, Figure 6 is a detail of one of the locking members, Figure 7 is a section of the tail holding device, Figure 8 is a top plan view partly in section of the tail holding device.

In the drawings wherein for the purpose of illustration is shown a preferred embodiment of my invention, the numeral 10 designates a cow, and 11 the hind legs of the cow. The numeral 12 designates the body portion of the leg holding element, terminating in a rolled lip 13 forming a connection for the link 14, one leg holding element and the link 15 of the other.

The body portion 12 is provided with an arm 16 which is hinged thereto by means of a suitable hinge 17. The arm 16 is formed preferably from a single strip of material, running parallel with the body portion 12 for a short distance and then bent transversely thereto and then bent again to run approximately parallel, or to diverge slightly toward the body portion 12 spaced far enough therefrom to allow the hind leg of a cow or other animal to fit snugly between the two.

A locking member 18 is pivoted on the body portion 12 by means of a bolt 19. One end of the locking member 18 is bent to form a handle 20 and the other end is bent to form a catch 21 to hold the arm 16 close to the body portion 12 when the device is applied to the leg of an animal. On one of the leg holding members is mounted a tail holding element, consisting of a member 22 having a lip 23 which is secured to the body portion 12 by means of a bolt 24 and a second lip 25 at right angles to the body portion 22 of the tail holding element. A cam 26 is mounted on the member 22 by means of a bolt 27 provided with an overhanging lip 28 to prevent the tail of an animal from slipping out.

A pulley 29 is connected to the link 15 and a flexible element 30 is run through the pulley and adjustably connected to the link 14 thereby connecting two of the said leg holding members, one of which is provided with a tail holding element.

In use the device is applied by clamping the body portion 12 and the arm 16 around the leg of a cow or other animal just above the hock joint. The handle 20 of the locking member 18 is swung down so that the catch 21 will firmly hold the arm 16 close to the body portion 12.

A leg holding device is applied to each of the hind legs, one of which being provided with a tail holding element, so when it is desired to hold the cow's tail simply open the clamp, that is swing the cam around, insert the tail between the cam 26 and the lip 25 and swing the cam back into position, thereby securely holding the tail.

In order to tighten this device on the cow's legs after both are applied, draw one end of the flexible element 30 through the link 14 and secure it. The flexible element is drawn tight enough to prevent the cow from kicking. To disengage the device from the cow's legs, simply strike the locking member 18 which releases the clamps and the cow is immediately released.

It is to be understood that the form of my invention herewith shown and described is to be taken as a preferred embodiment of the same, and that various changes in the shape, size and arrangement of parts may be resorted to without departing from the spirit of my invention or the scope of the subjoined claims.

Having thus described my invention, I claim:

1. A hopple of the class described comprising a body portion, an arm hinged thereto having its outer end formed to provide a gripping portion, a locking member pivoted to the body portion to retain the arm in closed position upon the body portion, an L-shaped bracket removably mounted on the body portion and means pivoted on the bracket to provide a tail-holding element for said hopple.

2. A device of the class described comprising a body portion, an arm hinged thereto having its outer end formed to provide a gripping portion, a locking member pivoted to the body portion to retain the arm in closed position upon the body portion, an L-shaped bracket removably mounted upon the body portion and an arm pivoted to the bracket to form a tail-holding element and having a flange extending therefrom to engage the end of said bracket.

3. An anti-kicking device of the class described comprising a pair of leg-engaging elements, a pulley mounted on one of said leg engaging elements, a link mounted on the other leg engaging element and flexible means passing around the pulley and adjustably fastened to the link at both of its ends.

In testimony whereof I affix my signature in presence of two witnesses.

EMORY H. HARFORD.

Witnesses:
JACOB EHRESMON,
A. E. LAURDALE.